April 19, 1932.  J. H. EDWARDS  1,855,103
FAUCET
Filed March 26, 1930  2 Sheets-Sheet 1
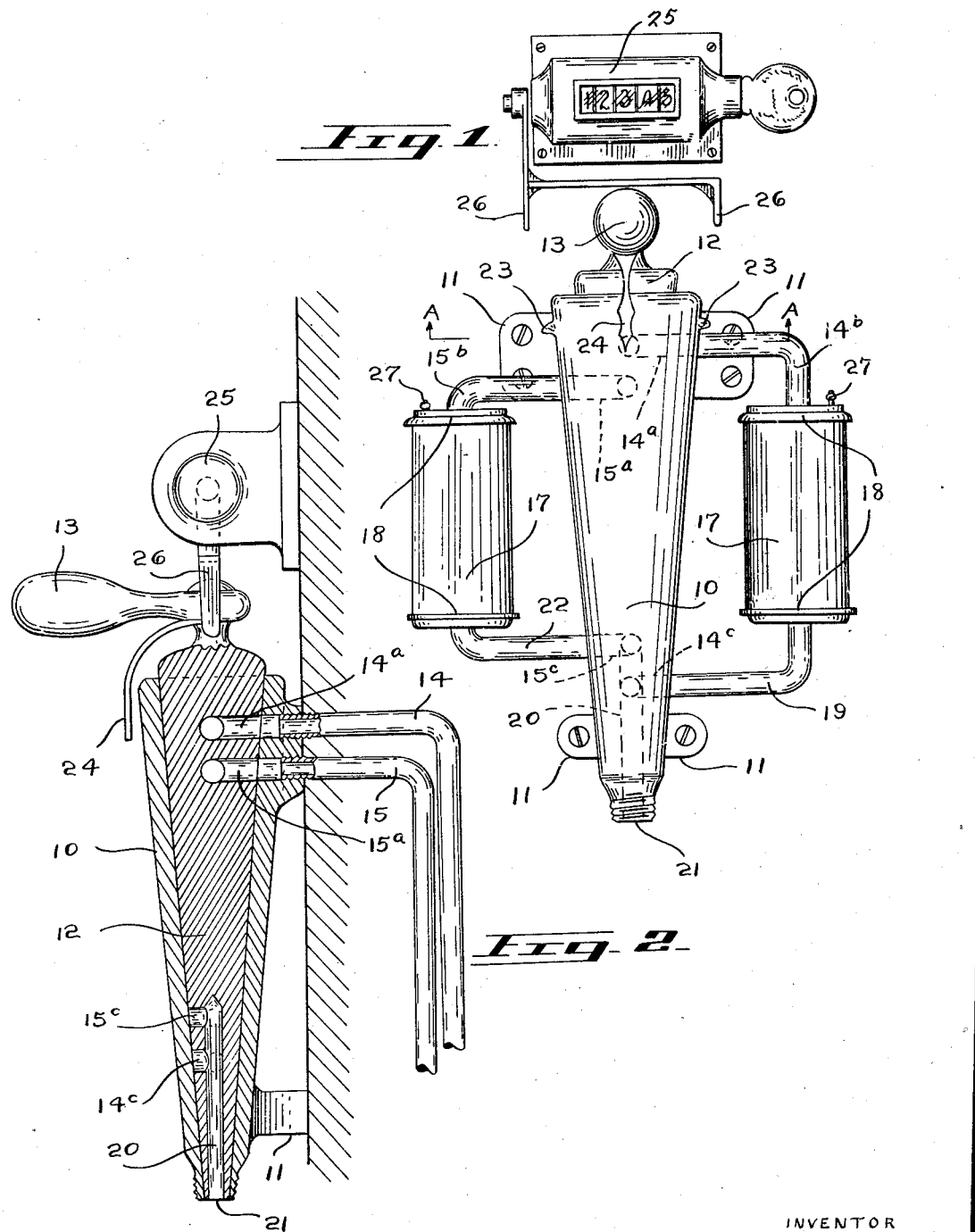
INVENTOR
James H. Edwards
By Ralph Burch
Attorney April 19, 1932.　　　J. H. EDWARDS　　　1,855,103
FAUCET
Filed March 26, 1930　　　2 Sheets-Sheet 2
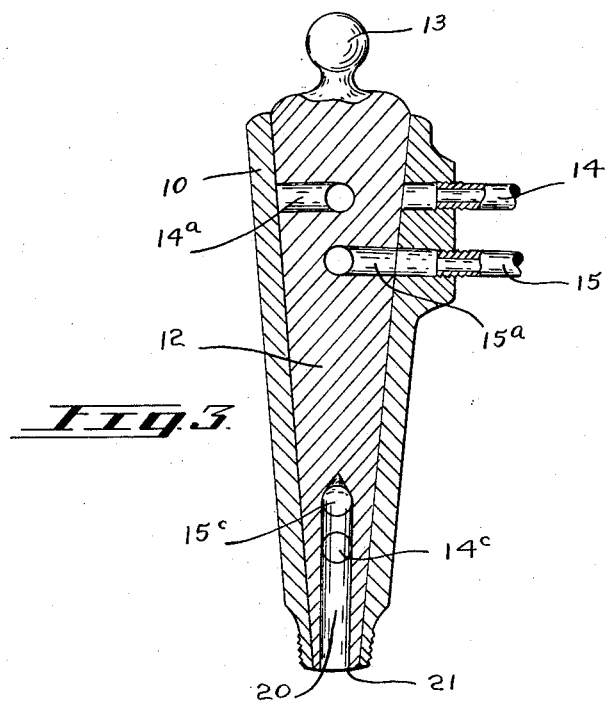
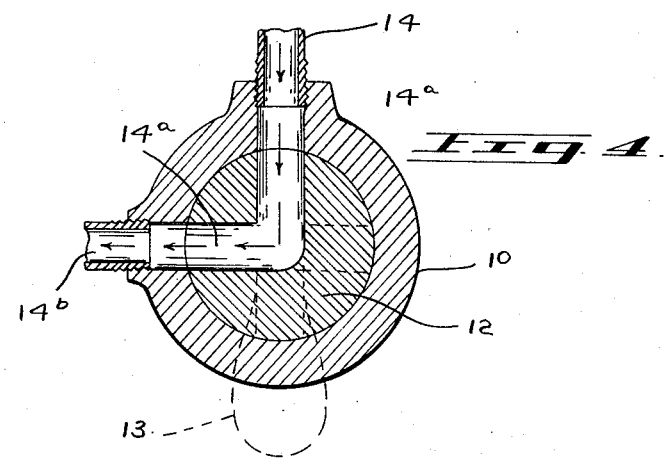
INVENTOR
James H. Edwards
By Ralph Burch
Attorney Patented Apr. 19, 1932

1,855,103

UNITED STATES PATENT OFFICE

JAMES HENRY EDWARDS, OF BURNABY, BRITISH COLUMBIA, CANADA, ASSIGNOR OF ONE-FOURTH TO JOHN C. POPHAM, ONE-FOURTH TO SAMUEL T. DARE, AND ONE-FOURTH TO MATTHEW J. PHILLIPS, ALL OF NEW WESTMINSTER, BRITISH COLUMBIA, CANADA

FAUCET

Application filed March 26, 1930. Serial No. 439,030.

This invention relates to certain new improvements in a faucet. Its primary object is to provide a means of dispensing two different liquids through one faucet.

A further object is to provide a means of measuring the said liquids as they are passed through the said faucet.

A still further object is to provide means of checking the number of times the faucet is opened, so that an accurate account may be kept of the quantity of liquids used and the cash that should represent the sale of said liquids.

With these and other objects in view as will appear as the description proceeds the invention consists in the novel construction and arrangement of parts as hereinafter more specifically set forth, claimed and shown in the accompanying drawings, forming a part of this present application and in which—

Figure 1 is a front elevation of my invention.

Figure 2 is a partial longitudinal section through the same, showing the faucet in the closed position.

Figure 3 is a longitudinal section through the faucet in the position which permits the liquid to flow from one of the measuring chambers.

Figure 4 is a cross section on the line A—A of Figure 1.

Referring more in detail to the drawings in which similar reference characters designate corresponding parts throughout the several views, it will be seen the invention consists of a faucet shell 10 having suitable lugs 11 by which it may be secured to a wall or where necessary. A faucet core 12 is fitted into the shell by the grinding method to insure a perfect fit. A handle 13 is secured on the top thereof by which the device is operated. A number of holes or passages are drilled into the core 12 and as the core is partially revolved so these holes are brought into alignment with corresponding holes in the faucet shell, the liquid is thereby directed to its desired place. Two feed pipes 14 and 15 are shown to lead the liquids from the source of supply to the faucet. When the handle 13 is on center the corresponding holes 14a and 15a, are brought into alignment with the intakes 14 and 15. 14a directs the liquid to the right hand outlet 14b, and into the measuring chamber 16. 15a directs the liquid to the left hand outlet 15b and into the measuring chamber 17, so that these measuring chambers are simultaneously filled, said measuring chambers being composed of glass cylinders with suitable means of securing top and bottom covers 18 to make them watertight. An outlet pipe 19 from the chamber 16 conducts the liquid back to the faucet again by which it is held until the handle 13 is brought over to left hand side. This brings a hole 14c into alignment with said outlet pipe 19 and permits the liquid to flow through the center hole 20 in the faucet core 12 and thence to the outlet 21. Likewise an outlet pipe 22 from the chamber 17 conducts the liquid back to the faucet again whereby it is held until the handle 13 is brought to the right hand side. This brings a hole 15c into alignment with said outlet pipe 22 and permits the liquid to flow through the center hole 20 in the faucet core 12 and thence to the outlet 21. Two small lugs 23 are provided one on each side of the faucet and a pointer 24 secured to the handle is designed to come into contact with the said lugs when the holes in the core and the shell are brought into the desired alignment with each other. A small air valve 27 is provided on each measuring chamber to aid the easy flow of the liquids. The outlet 21 may be provided with screw threads if so desired.

A standard make of counting attachment 25 is provided, having an arm 26 secured thereto and placed in such a manner that the handle 13 will come into contact with the said arm 26 when the said handle is turned to open the faucet thus providing a means of checking the number of times the said faucet is used.

It is believed that the construction and advantages of the structure shown may be apparent from the foregoing paragraphs taken in connection with the accompanying drawings without further detailed description.

In operation, it will be seen, that when the handle 13 is on center, the passages 14a and 15a are in registering relation with the feed pipes 14 and 15, and outlets 14b and 15b, respectively, permitting the liquid to flow into the measuring chambers 16 and 17, simultaneously. When the handle is in this position, the holes 15c and 14c are out-of register with the outlet pipes 22 and 19. Upon turning the handle to the right, the passages 14a and 15a are moved out-of register with the feed pipes and outlets and the hole 14c is brought into register with the outlet pipe 19, permitting the liquid to flow from the measuring chamber 16, into the discharge passage 20. By swinging the handle around to the left, the hole 15c is brought into register with the outlet pipe 22, permitting the liquid to flow from the measuring chamber 17. In swinging the handle from left to right, the passages 15 and 15a will again be brought into register, and liquid will flow into the chamber 17.

While the preferred embodiment of the invention has been disclosed, it is understood that minor changes in the details of construction and arrangement of co-operating parts may be resorted to within the scope of what is claimed without departing from the spirit of the invention.

What I claim:

In a faucet of the type described, a shell having a core rotatably mounted therein and vertically spaced ducts through the wall of said shell, feed pipes having connection with the ducts of said shell, opposed right angle ducts through the upper portion of said core, adapted to simultaneously register with said feed pipes and diametrically opposed outlets in said shell, measuring chambers on each side of said faucet having connection with said outlets in said shell, a discharge conduit extending axially of said core in its lower end, pipes leading from the bottom of said measuring chambers having connection with said shell at vertically spaced points adjacent its lower end, and communicating with the bore of said shell, ducts extending at right angles from said discharge conduit adapted to alternately register with said pipes leading from said measuring chambers, and means for rotating said core.

In testimony whereof I affix my signature.

JAMES HENRY EDWARDS.